DUAL CAPSTAN CONTROL SYSTEM

Filed Dec. 29, 1967

INVENTOR.
ALEXANDER R. MAXEY

BY
FOWLER, KNOBBE & GAMBRELL
ATTORNEYS.

INVENTOR.
ALEXANDER R. MAXEY
BY
FOWLER, KNOBBE
& GAMBRELL
ATTORNEYS.

INVENTOR.
ALEXANDER R. MAXEY

BY
FOWLER, KNOBBE
& GAMBRELL
ATTORNEYS.

DUAL CAPSTAN CONTROL SYSTEM

Filed Dec. 29, 1967

INVENTOR.
ALEXANDER R. MAXEY
BY
FOWLER, KNOBBE
& GAMBRELL
ATTORNEYS.

INVENTOR
ALEXANDER R. MAXEY
BY
FOWLER, KNOBBE & MARTENS
ATTORNEYS.

INVENTOR.
ALEXANDER R. MAXEY
BY
FOWLER, KNOBBE
& MARTENS
ATTORNEYS.

3,419,202

DUAL CAPSTAN CONTROL SYSTEM

Alexander R. Maxey, Newark, Calif., assignor to Westel Company, San Mateo, Calif., a copartnership of Westel Incorporated, Westel Associates and Westel California Investors, San Mateo, Calif., all corporations of California Continuation-in-part of application Ser. No. 537,222, Mar. 24, 1966. This application Dec. 29, 1967, Ser. No. 700,316
8 Claims. (Cl. 226—25)

ABSTRACT OF THE DISCLOSURE

Disclosed is a supply capstan and a take-up capstan for engaging and moving magnetic recording tape about a recording drum. The capstans are rotary coupled together by a pliant mechanical linkage, in the form of a flexible belt having physical elasticity characteristics which approximate those of recording tape extending between the capstans, or in the form of fluid coupling which damps rotary movement of one capstan out of phase relative to the other. Each capstan has a drive motor; and, a central system senses tension errors in the tape extending about the drum and applies differential signals to the motors so as to increase the torque supplied by one motor while decreasing that supplied by the other to minimize and/or correct the errors.

This application is a continuation-in-part of U.S. application Ser. No. 537,222 filed Mar. 24, 1966, now abandoned and titled Dual Capstan Control System. This invention relates to drum type magnetic tape recorders for recording and/or playing back signals along successive oblique traces on a magnetic recording tape, and has particular reference to a dual capstan system for engaging the magnetic recording tape and moving it about the drum while minimizing and/or correcting for errors in tape tension.

The drum type magnetic tape recorder includes a drum which serves as a mandrel for the tape, and means for guiding and moving the tape on the drum surface along a path oblique to the drum axis. A new drum type tape recorder is described and claimed in my copending U.S. patent application, Ser. No. 625,915, filed Feb. 27, 1967 and entitled Tape Recorder; and, to a lesser extent it is described herein. In this particular recorder, the magnetic tape extends substantially in excess of 360° in a spiral winding about a three-piece composite drum, with the center drum member being rotatable about the drum axis and being referred to herein as the recording drum. A record-reproduce head is mounted adjacent the periphery of the center drum member for recording and/or playing back signals along successive oblique traces on the tape. Each record trace extends 360° about the drum.

It can be seen that in a drum type tape recorder a record trace when recorded will occupy a predetermined angular distance about the drum which at that time will represent a certain length of tape or length of record trace. It is desirable during the recording process to keep the tension of the tape on the drum at a constant value inasmuch as magnetic recording tape is elastic and variations in tension will produce variations in the length of the recorded traces. Furthermore, it will be appreciated that whatever the conditions of temperature, humidity, tape tension, and coefficients of friction at the time the recording was made, some or all of these conditions likely will have changed by the time the tape is played back. Also, the tape may be played back on a different machine which, although intended to be identical with the machine on which the recording was made, may contain a small variation in drum dimensions and other differences. Also, either during record or playback, sudden variations in the tape tension may be produced by a sticky fingerprint on the tape or on some guiding surface, or may be caused by almost an endless variety of occurrences which either on a steady or on a momentary basis can alter significantly the total frictional force on the tape extending about the drum and/or other components in the tape path so as to produce a tension variation.

Hence, during the recording process the basic problem is to maintain the tape tension about the drum constant; whereas during playback, the problem is to duplicate the record trace lengths and locations about the drum as existed during the recording process, and this may be expected to involve establishing and maintaining a different average tape tension, inducing desirable variations in tape tension, and compensating for and/or eliminating undesirable tape tension variations. These problems are solved or minimized by the dual capstan control system of the present invention.

In accordance with the present invention, a dual capstan control system includes a tape supply capstan and a tape take-up capstan for engaging the magnetic recording tape and moving it about the drum, the two capstans being rotary coupled by a pliant mechanical linkage. A motor is coupled to the take-up capstan and means are included for driving the motor.

In one embodiment of the invention, the pliant mechanical linkage takes the form of a viscous or fluid coupling between the capstans. The fluid coupling has the advantage of being pliant but non-elastic, so as to minimize or eliminate any resonance in the vicinity of the tension correction frequencies.

In another embodiment of the invention the pliant mechanical linkage takes the form of a closed belt of tape, and means coupling the belt in rotary relationship to the capstans. The belt of tape has approximately the same physical elasticity characteristics when applied through its coupling means to the capstans as has the magnetic recording tape extending between the capstans, so that for a given angular displacement of the supply capstan out of phase relative to the take-up capstan, the belt tends to produce a change in torque on the supply capstan which is of the same order of magnitude as that produced by the magnetic recording tape.

Coupling the capstans together with the pliant linkage causes the magnetic recording tape extending between the capstans to act as a closed loop system which is slightly open. This helps isolate the recording tape loop extending between the capstans from tension perturbations in the magnetic tape external to the loop after the fashion of a low pass filter, while permitting a degree of phase control of one capstan relative to the other to correct tension errors within the loop. Also, this provides a significant degree of self-compensation which opposes changes in tension in the magnetic tape within the loop as a function of changes in coefficient of friction between the tape and components within the loop.

The present invention also contemplates, both in cooperative combination with the pliant linkage structure and as a separately useful subcombination, an additional control for the capstans wherein the tape supply capstan is as well coupled to a motor and means are included for driving both the supply capstan and the take-up capstan motors. There is a means for sensing tension errors in the tape extending about the drum during playback, and means responsive to the sensing means for applying differential signals to the drive means so as to increase the torque on one motor while decreasing the torque on the other motor to correct tension errors.

This differential control tends to minimize any perturbations in the tape at the control track and audio record-reproduce heads located adjacent the take-up capstan resulting from the correction of tape tension errors within the loop.

The foregoing and other features of the present invention will be better understood from the following detailed description taken in conjunction with the accompanying drawings, in which.

Figure 1:
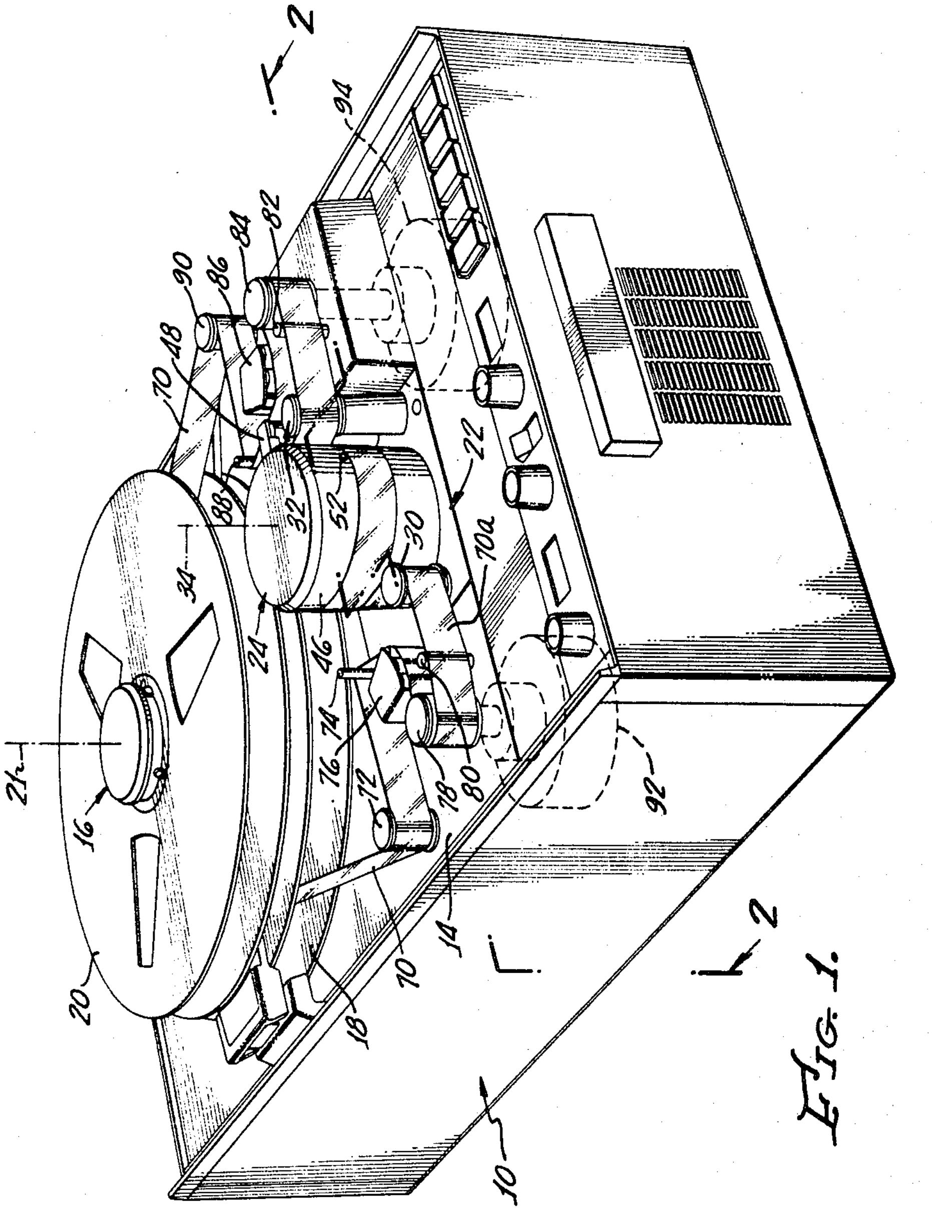
FIG. 1 is a perspective view of a drum type video tape recorder which incorporates the dual capstan control system and utilizes the closed belt as a pliant linkage coupling the capstans.
Figures 2, 3:
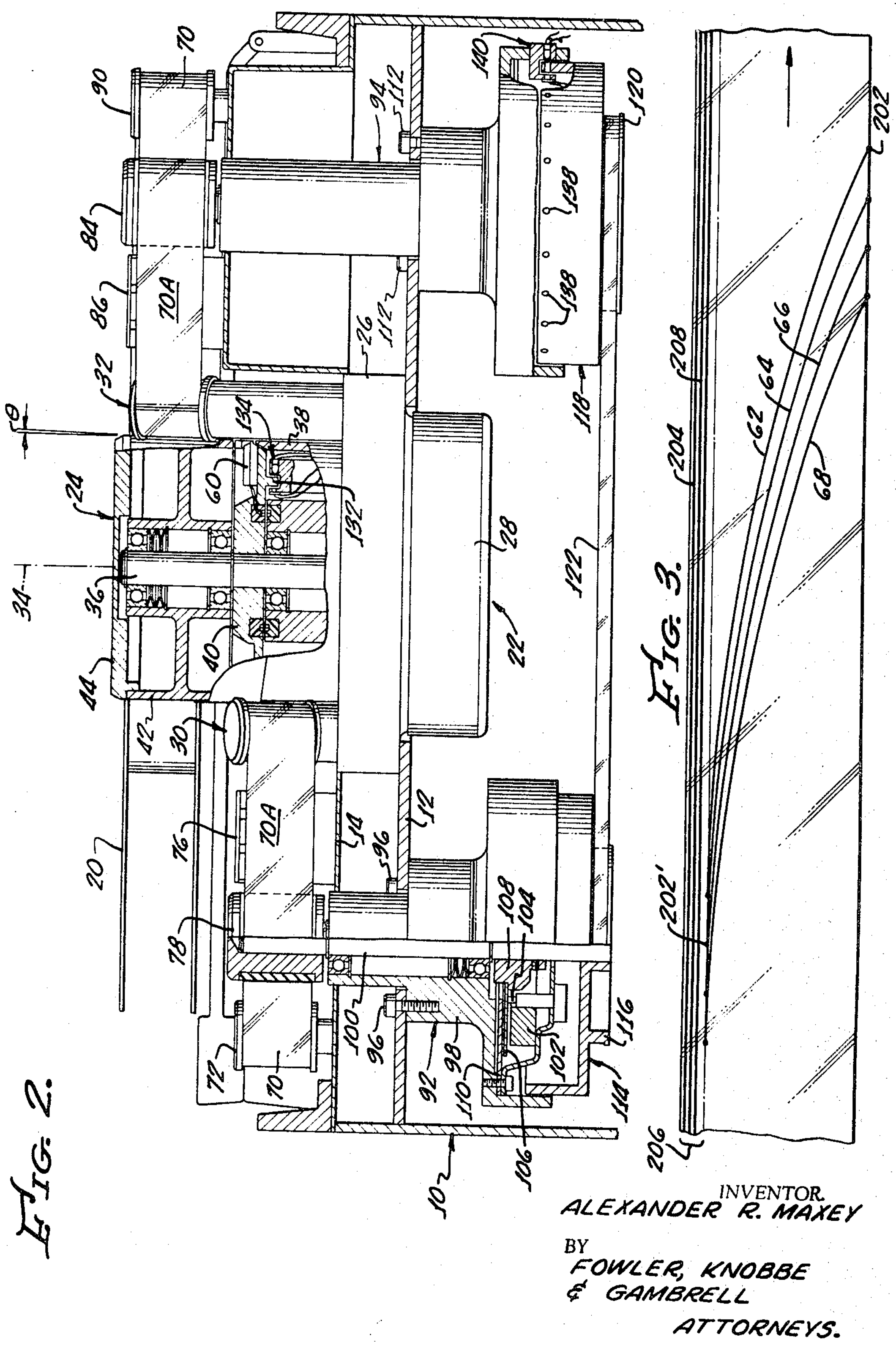
FIG. 2 is a fragmentary sectional view taken generally along line 2—2 of FIG. 1.
FIG. 3 is a schematic illustration of a strip of magnetic recording tape illustrating successive oblique traces thereon containing video signal information and longitudinal traces containing audio and control signals.

Referring now to FIGS. 1 and 2, a drum-type magnetic tape recorder which may be utilized to record television signals includes a body and frame 10 generally in the form of a rectangular parallelepiped. The frame 10 includes a mounting plate 12 and an upper deck 14 disposed above the mounting plate in spaced relation thereto. A coaxial reel mounting and driving assembly 16 supports a tape supply reel 18 and tape take-up reel 20 in coaxial relationship on top of the recorder about an axis 21, with the supply reel disposed below the take-up reel.

The drum assembly 22 includes a three-piece drum 24, a sub-frame 26, a drum motor 28, a tape entrance guide 30 and a tape exit guide 32. The drum and the tape entrance and exit guides are mounted on top of the sub-frame 26 which is in turn mounted on the support plate 12 at a central location so that the drum is about on the same level with the supply and take-up reels with the drum axis 34 parallel to the axis 21 of the reels. The drum motor 28 is mounted coaxially with the drum on the lower side of the sub-frame 26, and drives a shaft 36 extending coaxially of the drum.

The drum includes a lower drum member 38, a central drum member 40 and an upper drum member 42 having a cap 44 extending across the top thereof. The peripheral surfaces of each of the lower central and upper drum members forms a substantial part of the composite drum surface 46. The composite drum surface is substantially frustoconical, with the smaller end of the cone at the bottom and the larger end at the top. The lower drum member 38 is rigidly mounted to the sub-frame 26 and the drive shaft 36 is journalled in it. The central drum member 40 is rigidly mounted on the drive shaft for rotation therewith. The upper drum member 42 is rotatably journalled at the upper end of the drive shaft and is held in a stationary position by a releaseable latch 48.

In conjunction with a plurality of guide buttons 50, 52, 54, 56 disposed on the lower and upper stationary drum members, the entrance guide 30 and exit guide 32 provide a means for guiding the tape to the lower or smaller end of the drum, around the drum in a spiral of increasing pitch for substantially in excess of 360°, and away from the upper or larger end of the drum, with edge portions of adjacent tape convolutions overlapping each other in an area 58 which extends from the lower to the upper stationary drum member. As the drum motor 28 drives the drive shaft 36, the center drum member or recording drum 40 rotates about the drum axis 34. A record-reproduce head 60 hereinafter called the video head is mounted adjacent the periphery of the central drum member and engages the inner side of the tape spiral for recording and/or reproducing television signals thereon in successive oblique traces 62, 64, 66, 68 (FIG. 3) as the tape is moved about the drum.

The magnetic recording tape 70 extends from the supply reel 18 around the roller 72 and post 74 of a tape supply tension device (not shown), across a set of record-reproduce heads 76 to and around a rubber-surfaced supply capstan 78 and over a post 80 to the tape entrance guide 30. On exiting the drum the tape extends around the tape exit guide 32, a guide post 82, around a rubber-surfaced take-up capstan 84 thence across a set of record-reproduce heads 86 and around a post 88 and roller 90 of a take-up tension device (not shown) and on to the take-up reel 20.

While there are no pinch rollers shown, the tape supply tension of about six ounces is more than sufficient to maintain the tape in solid engagement with the rubber surfaced supply capstan 78; similarly, the take-up tension of about six ounces is sufficient to maintain solid engagement of the tape with the take-up capstan 84. Thus, extending between the supply capstan 78, around the drum 24 and to the take-up capstan 84 is a loop of magnetic recording tape 70A which, if the capstans were rigidly phase-locked together either mechanically or electrically, would constitute a closed loop.

The supply capstan 78 and the take-up capstan 84 are disposed on opposite sides of the drum assembly 24. A supply capstan motor 92 is disposed coaxially with the supply capstan 78, and a take-up capstan motor 94 is disposed coaxially with the take-up capstan 84. The supply capstan motor 92 is mounted on the underneath side of the support plate 12 by a plurality of machine screws 96. It is a conventional direct current printed circuit type motor having a non-magnetic body 98, and a motor shaft 100 rotatably journalled in the body, with the supply capstan 78 fixed on the upper protruding end of the drive shaft. The motor has a stator field magnet 102, a pair of brushes one of which is shown at 104 and a flat printed circuit type armature 106 suspended by a hub 108 connected to the shaft 100, so that the armature 106 extends between the field magnet 102 and a magnetic plate structure 110 connected to the motor body 98 and supporting the brushes and stator field magnet. The take-up capstan motor 94 is similarly constructed and is mounted on the underside of the support plate 12 by a plurality of machine screws 112.

The supply motor has a fly wheel 114 mounted on the protruding bottom end of the motor shaft 100 and the fly wheel as a depending pulley portion 116 formed thereon. Similarly, the take-up motor 94 has a fly wheel 118 connected to the bottom end of the motor shaft thereof, with a depending pulley portion 120 formed on the fly wheel.

A closed belt 122 of tape extends around and between the pulley portions 116, 120. Hence, the belt is coupled to the supply capstan 78 through the motor shaft 100 of the supply motor 92, and to the take-up capstan 84 through the motor shaft of the take-up motor 94. The belt 122 acts on the supply motor shaft 100 through a greater lever arm than does the recording tape loop 70A. This is considered to give a smoother action in compensating for tape tension changes in the tape loop 70A than would be obtained by using a wider or stiffer belt on a smaller diameter pulley .

In the embodiment illustrated, the magnetic recording tape is Mylar tape approximately, .001 inch thick, 1 inch wide and has a magnetizable oxide coating thereon. The tape in the loop 70A is 34 inches long, and the capstans each have a diameter of 1.27 inches. The closed belt 122 is Mylar tape having a width of .25 inch, a length of 32 inches and a thickness of about .003 inch. The diameter of each pulley portion 116 and 120 is 2.84 inches.

Figure 4:
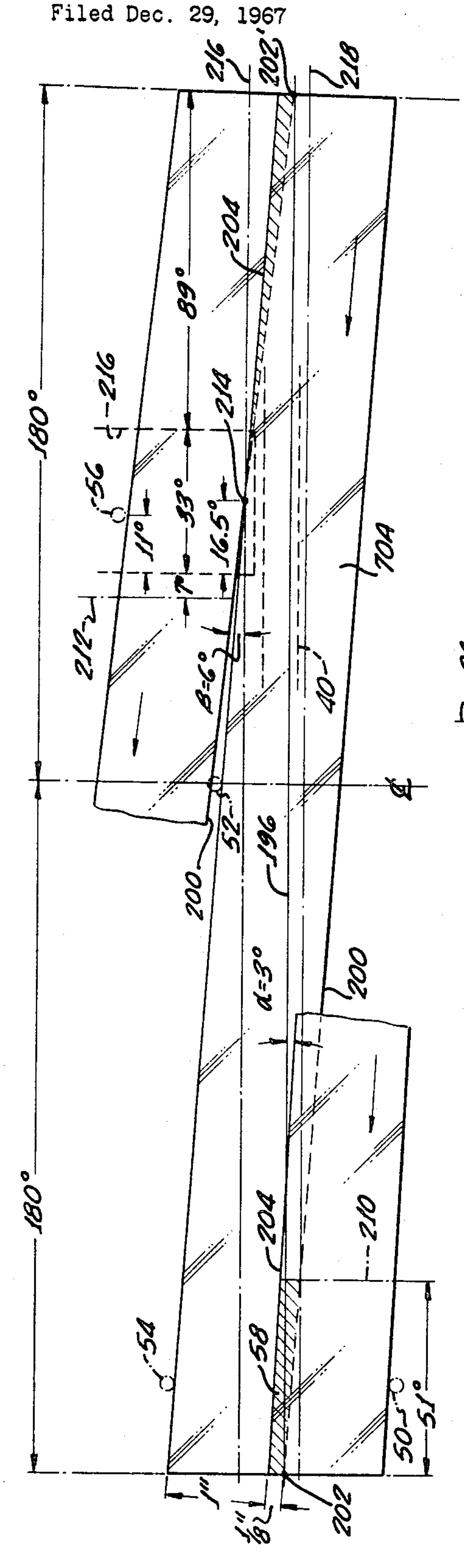
FIG. 4 is a linear diagrammatic representation of the spiral tape winding which extends about the drum.
Figure 5:
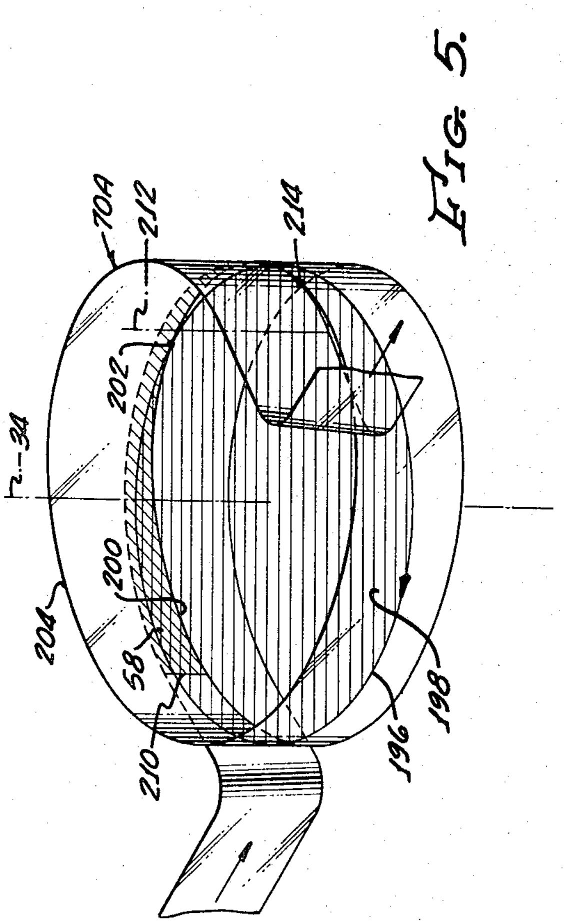
FIG. 5 is a schematic perspective view of the tape spiral.
Figure 6:
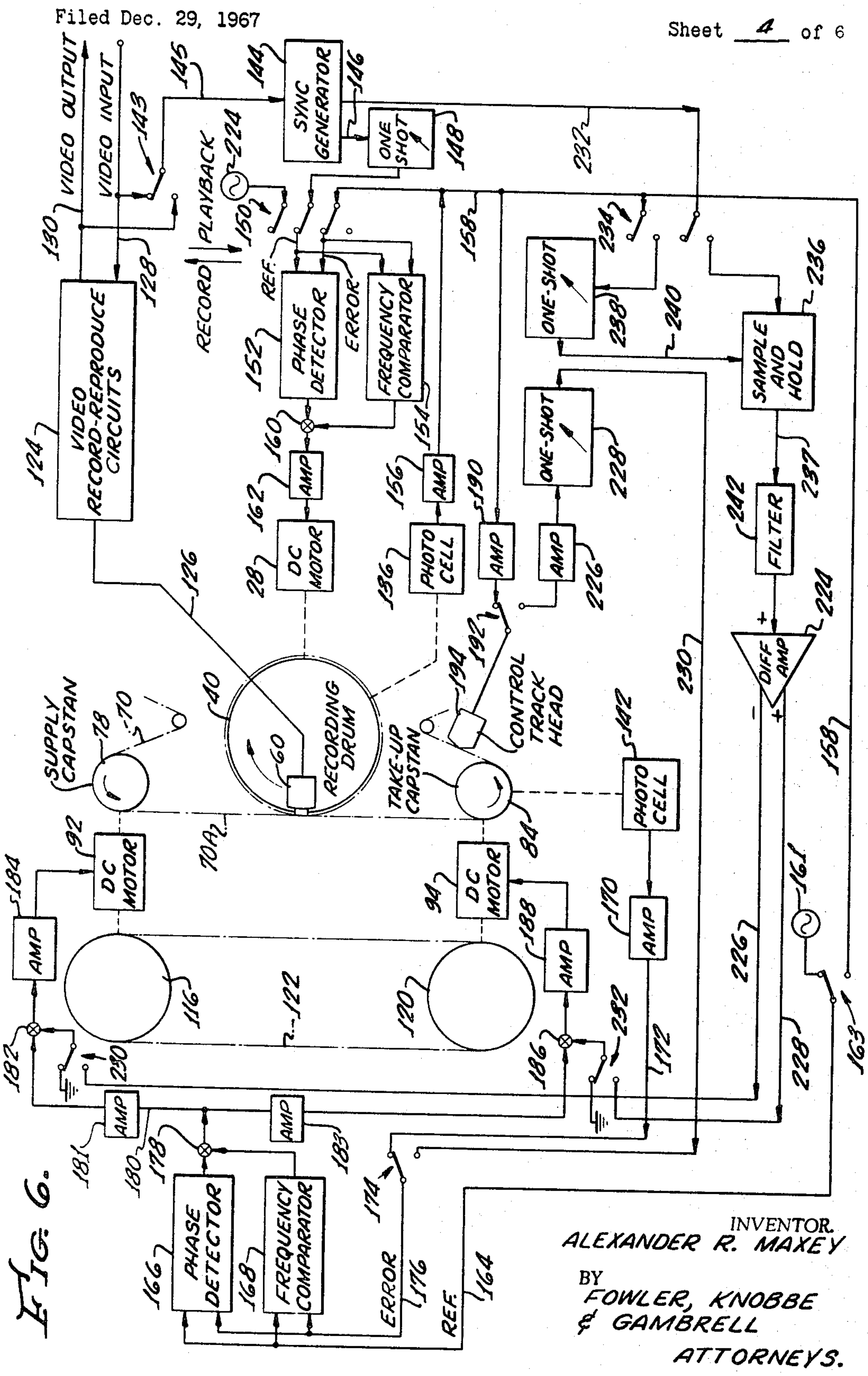
FIG. 6 is a schematic circuit diagram illustrating the controls for the recording drum and capstans.

Referring now to FIGS. 3 to 6, and primarily to FIG. 6, a video tape recorder includes video record-reproduce circuits 124 electrically coupled by a connection 126 to the video head 60 mounted on the recording drum 40 of the drum assembly. During the record operation, the video record-reproduce circuits receive a composite television signal over an input lead 128 and this signal is modulated and supplied to the video head 60 which records the modulated signal on successive oblique tracks as the tape 70 is moved about the drum and the head 60 is rotated. During playback, the modulated signal picked up by the video head 60 is demodulated in the video record-reproduce circuits 124 and supplied on a video output lead 130.

A number of double throw switches are illustrated in FIG. 6. They are uniformly in the up position as shown during the record operation, and are switched by conventional electrical means (not shown) to the downward position during the playback operation.

The angular position of the recording drum 40 is known by virtue of an interior tang 132 which interrupts light once each revolution of the recording drum otherwise passing between an aligned lamp and photocell structure 134 (FIG. 2). The photocell 136 of this structure is seen in FIG. 6 in block schematic form.

Also, the rotary position of the take-up capstan 84 is known by virtue of a plurality of twenty openings 138 formed evenly around the upper periphery of the fly wheel 118 on the take-up capstan motor 94, which holes periodically permit the passage of light between a lamp and photocell structure 140 of which the photocell 142 is illustrated in block schematic form in FIG. 6.

During the record process, input video over lead 128 is applied through a switch 143 to the input lead 145 of a sync generator 144. The sync generator 144 generates a clean version of the stripped vertical sync signals and supplies them over an output lead 146 to a one-shot multivibrator 148. While it is possible to use a conventional vertical sync stripper for purposes of servoing the recording drum, I prefer to use the sync generator 144, the details of which are described and claimed in the copending U.S. patent application of Alan G. Grace, Ser. No. 535,929, filed Mar. 21, 1966, and entitled Sync Generator and Recording System Including Same. The output from the one-shot multivibrator 148 is applied through one pole of a three-pole double throw switch 150 to the reference input of a phase detector 152 and a frequency comparator 154. The error input to the phase detector 152 and frequency comparator 154 is supplied by the drum photocell 136 through an amplifier 156, thence over an output lead 158 and through another pole of the switch 150. Thus, vertical sync pulses from the sync generator are compared with pulses from the drum photocell, with the output of the phase detector and frequency comparator being supplied through a summing circuit 160 to amplifiers 162 which drive the D.C. drum motor 28. Hence, the center drum 40 rotates at a speed determined by the frequency of the vertical sync pulses from the sync generator 144 during the recording process.

Also during the recording process, the D.C. motors 92, 94 coupled to the supply and take-up capstans are driven by applied voltages proportional to a phase comparison of the output of the take-up capstan photocell 142 with a 60 cycle reference source 161. The reference source 161 is coupled through a single pole double throw switch 163 to the reference input lead 164 of a phase detector 166 and frequency comparator 168. The output from the take-up capstan photocell 142 is applied through an amplifier 170 over an output lead 172 and through a single pole double throw switch 174 to the error input lead 176 for the phase detector 166 and frequency comparator 168. The output from the phase detector and frequency comparator is applied through a summing circuit 178 to an output lead 180 which applies the output through a first coupling amplifier 181 to a first summing circuit 182 coupled to amplifiers 184 which drive the supply capstan motor 92, and through a second coupling amplifier 183 to a second summing circuit 186 coupled to amplifiers 188 which drive the take-up capstan motor 94.

Durng the record operation, the amplified output of the drum photocel 136 is coupled through a recording amplifier stage 190 and a single pole double throw switch 192 to a control track head 194, which is one of the set of record-reproduce heads 86 located adjacent the take-up capstan, so as to record a 60 cycle per second control track signal along a longitudinal path 208 on the tape.

Referring now more particularly to FIGS. 3 to 5, the video head 60 is rotated about the drum axis at 60 cycles per second and describes a circular path or scan line 196 defining a scan plane 198 intersecting the tape winding 70A about the drum. With the recording drum rotating in the clockwise direction when viewed from its large or top end, the video head 60 will fall off of the lower exposed edge 200 of the tape 70A at a point 202 and onto the previous tape convolution at a point 202′ which is spaced downwardly from the top edge 204 of the tape by a distance of about one-eighth inch as the result of the tape overlap area 58 and the geometry and dimensions chosen. The drop-off point 202 and the drop-on point 202′ are very nearly the same point when the tape is wrapped about the drum, although at this point there is unavoidably some small discontinuity of about 100 to 180 microseconds in the signal which is referred to as the "dropout."

The overlap area 58 inherently leaves a border area 206 along the top edge 204 of the tape. It is in this border area that audio signals may be recorded in a longitudinal fashion by heads in the set of record-reproduce heads 86. Also, the control track 208 extends longitudinally in this area, this being the longitudinal path along which the control track head 194 of the set of heads 86 records and/or reproduces control signals nominally at 60 cycles per second.

The values utilized to achieve the tape wrap illustrated is approximately as follows: The drum has a diameter of about 3.82 inches at the scan line 196 and has a cone half angle of about one-third of one degree of arc. The center drum 40 has a height of about .325 inch, and its peripheral surface is recessed about .001 inch relative to the adjacent peripheral surfaces of the upper and lower drum members. The tape entrance angle is about three degrees. The tape enters the drum approximately along a tangent line 210, 51° in advance of the drop-off point 202, and extends about the drum for 540° to a tape exit tangent 212 where the tape exits the drum at an exit angle of about six degrees. The tape spiral is of increasing pitch such that the lower edge 200 of the exiting tape crosses the upper edge 204 of the preceding tape convolution at a point 214 which is located about 105° around the drum from the drop-off point 202. At the cross-over point 214 the exiting tape is pulling out from under the previous tape convolution and the upper drum member has a recessed area illustrated schematically at 216 which provides relief for the tape edges at the cross-over point, especially for tape rewinding purposes. The tape entrance tangent 210 and the corss-over point 214 define the opposite ends of the overlap area 58. At the upper and lower extremities of the overlap area planes 216 and 218 demark a closed collar of tape extending about the drum and across the center drum member 40 so as to facilitate the creation of an air bearing, with air being supplied through a peripheral opening in the center drum member 40 adjacent the record-reproduce head 60 as more fully described in my above-mentioned copending U.S. patent application, Ser. No. 625,915.

Referring again to FIGS. 6 and 7, during the record operation the one-shot multivibrator 148 is adjusted so that the dropout or the point at which the record-reproduce head crosses the drop-off point 202 is within the vertical blanking interval in the composite television signal. Thus, none of the actual video signal information is lost by reason of the dropout; only synchronization signals are lost.

During playback all the switches are thrown to the downward position as indicated by the arrows in FIG. 6. The video output off of tape on lead 130 is applied through the switch 143 to the sync generator 144 which is at that time connected to the error input of the phase detector 152 and frequency comparator 154. The reference input to these circuits is connected through the switch 150 to a 60 cycle per second reference source 224. Thus, the vertical sync information seen by the video head 60 is caused to correspond with the reference source 224, and the recording drum servo loop will cause the D.C. motor 28 to drive the recording drum faster or slower in order to accomplish this as necessary.

Also during playback, the control track head 194 looks at the previous 60 cycle per second control signal recorded in the control track 208 on the tape and applies this signal through an amplifier 226 to a one-shot multivibrator 228, and thence over an output lead 230 and through the switch 174 to the error input 176 of the phase detector 166 and frequency comparator 168, the combined output from which over lead 180 controls the main driving torque applied by the capstan motors 92, 94. At this time, the reference signal applied to the phase detector 166 and frequency comparator 168 is supplied over the lead 158 from the drum photocell 136 and amplifier 156. The one-shot multivibrator 228 coupled in the circuit from the control track head 194 provides an adjustable delay so as to initially cause the D.C. motors 92, 94 to drive the tape at a speed and phase relationship relative to the video head 60 that will cause the video head to track on the previously recorded traces on the tape. Once this is set, any variation in the recording drum speed will be noted by the drum photocell 136 so that a slightly different frequency than 60 cycles per second is applied as the reference frequency on lead 164, thus causing the D.C. capstan motors 92, 93 accordingly to change the tape speed so that the signal from the control track head 194 corresponds in phase. Thus, if the recording drum servo loop causes the recording drum to rotate faster because the vertical sync off of tape is at too low a frequency, the main capstan servo loop from the control track head through the phase detector 166 and frequency comparator 168 will cause the tape speed to increase accordingly, in order that the video head 60 continues to track on the successive recorded traces on the tape.

In addition to the main servo loop from the control track head 194, a secondary servo loop is utilized during playback to apply a differential signal to the capstans to correct for tension errors in the tape loop 70A. This secondary servo loop includes an output lead 232 from the sync generator which runs to one pole of a double pole, double throw switch 234, and through the switch is coupled to a sample and hold circuit 236. The amplified output of the drum photocell 136 is applied over lead 148 through another pole of the switch 234 to a one-shot multivibrator 238, and an output lead 240 from the one-shot multivibrator runs to the sample and hold circuit 236. The output of the sample and hold circuit is applied over a lead 237 to a compensating filter 242, and through the compensating filter to a differential amplifier 244. The differential amplifier has first and second output leads 226, 228 which run respectively to switches 230, 232 and through these switches are coupled to the summing circuits 182, 186. These summing circuits are in turn coupled to the amplifiers 184, 188 which drive the supply capstan motor 92 and take-up capstan motor 94.

The signal on the output lead 232 from the sync generator contains information indicative of tape tension errors in the tape extending about the recording drum 40. The signal may be positive or negative in wave form depending on the tension error; and, we may assume that if the signal is positive the tension is too small and if the signal is negative, the tension is too great, the former causing the recorded trace to occupy too small a distance around the recording drum 40 and the latter causing it to occupy too great a distance.

The sample and hold circuit 236 samples this signal immediately following the occurrence of the dropout during the vertical blanking interval for about 500 microseconds. This is accomplished by driving the one-shot multivibrator 238 from the amplified output of the drum photocell 136, and adjusting the time delay provided by the one-shot multivibrator 238 so that it supplies a one-half millisecond pulse on its output lead 240 at the proper moment relative to the dropout. Thus, the sample and hold circuit will sample the signal from the sync generator over lead 232 at about 60 cycles per second, and the voltage level on its output 237 will remain constant while the record-reproduce head scans video information and will change to a different voltage level at the moment of sampling just following the dropout in the vertical blanking interval in accordance with tape tension error. The output from the sample and hold circuit 236 may be positive or negative. Assuming a positive output, the differential amplifier 224 will provde a negative and positive output voltage respectively on its output leads 226, 228, a direction which potentially causes the supply capstan motor to decrease its torque and the take-up capstan motor to increase its torque so as to immediately increase the tension in the tape around the recording drum. Actually, the transient increase in torque at the take-up capstan will produce an opposing signal in the control track servo loop so as to decrease the signal supplied by that loop to the summing circuits so that the net effect tends to be cancelled at the take-up capstan and doubled at the supply capstan, a situation which minimized perturbations in tape tension outside the loop 70A adjacent the take-up capstan and therefore minimizes flutter in the audio and control track signals picked up by the set of heads 86.

Figure 7:
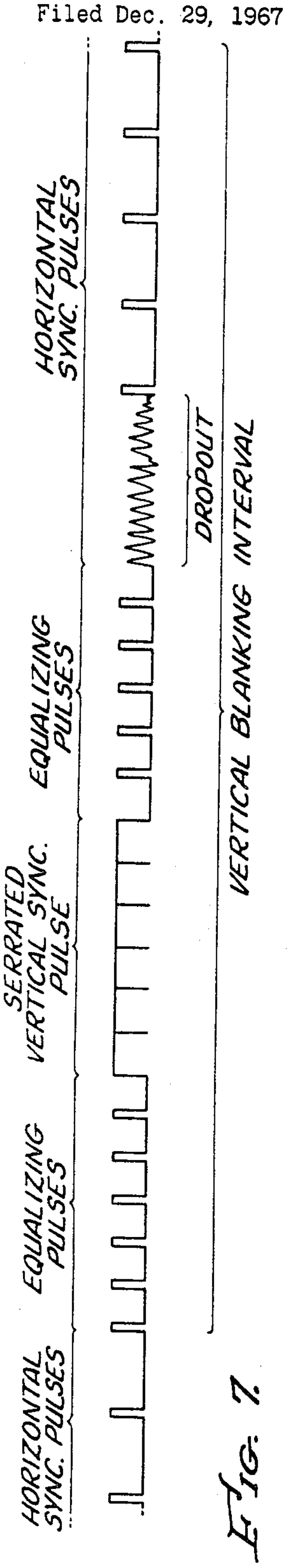
FIG. 7 is a schematic diagram illustrating the synchronization signals in a composite television signal.

FIG. 7 schematically illustrates the sync pulses in a television signal. The horizontal sync pulses occur at 15,750 cycles per second. The vertical sync pulses occur at 60 cycles per second with equalization pulses on each side of the vertical sync pulse as well as serrations on the vertical sync pulse occurring at 31,500 cycles per second. The vertical blanking interval begins with the leading equalizing pulses and extends beyond the equalizing pulses which follow the vertical sync pulse to include the first seven or so horizontal sync pulses corresponding to horizontal lines which contain no video information. As previously indicated, the dropout which may be 100 to 180 microseconds is set by virtue of the one-shot multivibrator 148 to occur during the vertical blanking interval. As illustrated in FIG. 7, the dropout is set to occur following the vertical sync pulse and the equalizing pulses.

Figures 8, 9:
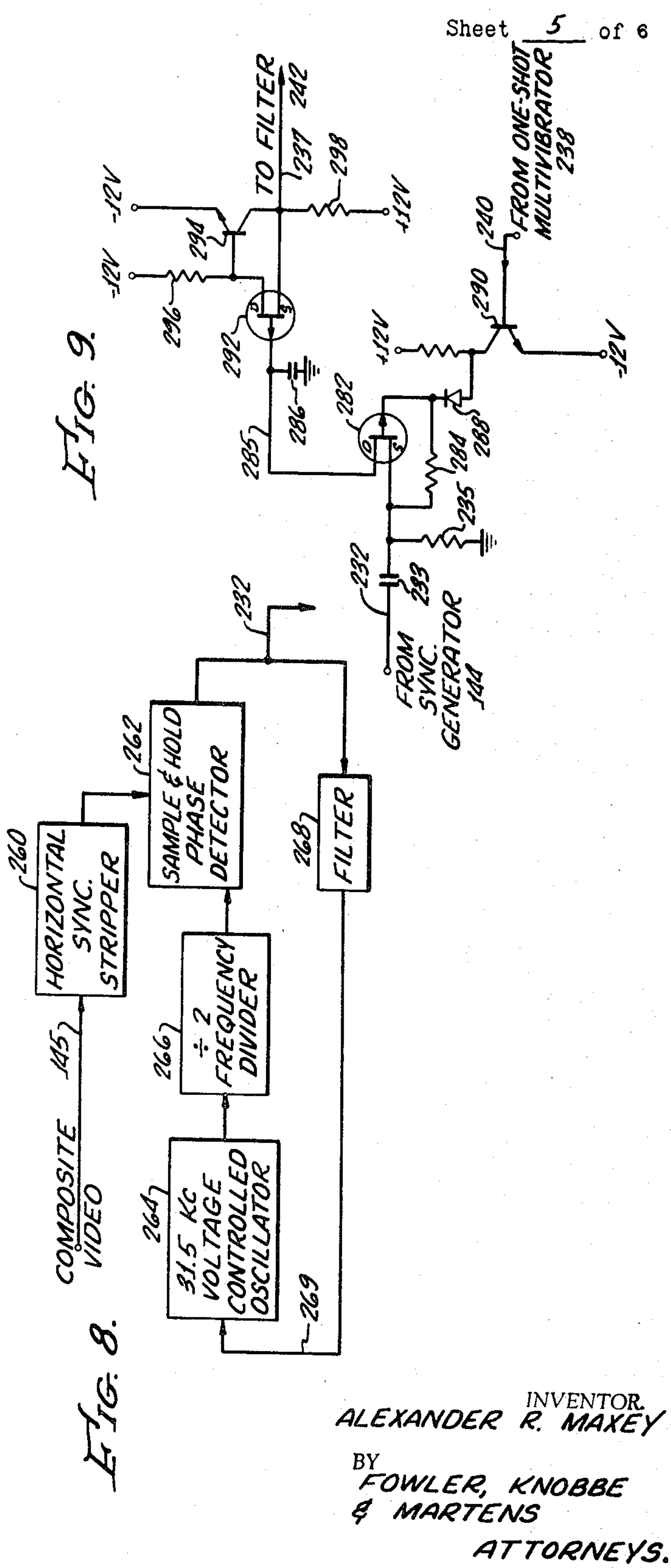
FIG. 8 illustrates the servo loop portion of the sync generator of FIG. 6 involved in generating a signal indicative of tape tension error in the tape extending about the drum.
FIG. 9 is a circuit diagram of the sample and hold circuit of FIG. 6.

FIG. 8 illustrates a portion of the sync generator circuit 144. As seen, the composite video signal is supplied over the lead 145 to a horizontal sync stripper 260 which supplies stripped horizontal pulses as a sample command to a sample and hold phase detector 262. A 31.5 kc. voltage controlled oscillator 264 supplies its output through to a frequency divider 266 which provides a frequency of 15,750 cycles per second, the horizontal sync rate. The output of the frequency divider 266 is applied to the phase detector 262 to generate a ramp signal, which is sampled during the occurrence of a horizontal sync pulse on the output of the stripper 262. The phase detector 262 may have an output of zero volts when the ramp is sampled centrally, with the output of the phase detector varying from +6 to −6 volts to cover leading and lagging phase differences. This output is supplied over the lead 232 and through a compensating filter 268 over a lead 269 to the control input of the 31.5 kc. voltage controlled oscillator. A positive voltage is supplied when the horizontal sync off of tape leads in phase the divided oscillator signal. This causes the voltage controlled oscillator to increase its frequency to bring its divided output back into the phase relationship with the horizontal sync off of tape. A negative output of the phase detector will slow the voltage controlled oscillator.

In operation, the output signal of the phase detector 262 will change in D.C. level both positively and negatively about zero volts during the continuing television signal. However, the dropout which occurs at 60 cycles per second represents a discontinuity such that the horizontal sync pulses 280 immediately following the dropout will have an indeterminate phase relationship relative to the sync pulses preceding the dropout. Any variation in phase at this point however will be primarily attributable to a tension error in the tape extending about the drum. The range of such tension errors in the embodiment illustrated is about 4 ounces which represents an elongation of about ±0.005 inch in a piece of 1" x 0.001" Mylar tape about 12 inches long and which on the tape represents ±7 microseconds of signal. The dropout has a duration of about 100 to 180 microseconds. Thus, the signal on the lead 269 controlling the oscillator 264 will be at or near the apex of a positive or negative shaped waveform following each dropout depending mainly on tape tension error, with subsequent variations in the signal on lead 269 prior to the next dropout being more predominantly due to other effects as well as tension variations. This is the reason for sampling the signal on the lead 232 with the sample and hold circuit 236 for a controlled interval immediately after the dropout.

While sample and hold circuits are known in the art, I prefer to use the one shown in FIG. 9 wherein the output from the phase detector 262 over lead 232 from the sync generator is applied through a coupling capacitor and resistor network 233, 235 to the source electrode of a field effect transistor 282. The capacitor 233 may be about 1 μf. and the resistor 235 about 20 KΩ. This A.C. coupling network 233, 235 passes the positive and negative signal variations on the output lead 262 about zero volts while blocking the D.C. voltage level. With no bias on the gate electrode of the field effect transistor 282, the device is in its highest conductive region so that any signal supplied at its source electrode will appear at the drain electrode and over a lead 285 will charge a sampling capacitor 286, which may be about .0068 μf. The capacitor 286 will be charged either positively or negatively according to the signal passed by the capacitor and resistor network 233, 235 coupled to the source electrode of the field effect transistor 282 when the latter is conductive.

Normally, the field effect transistor 282 is biased off very hard. Thus, the source and gate electrodes of the field effect transistor 282 are tied together by a 100 KΩ resistor 284. The gate electrode is connected to the cathode of a diode 288 whose anode is connected in parallel to the collector of a control transistor 290 and through a resistor to a positive 12 volt supply. The base of the control transistor 290 is connected to the output 240 of the one-shot multivibrator 238 driven by the amplified signal from the drum photocell 136. The emitter of the transistor 290 is connected to a negative 12 volt supply.

The transistor 290 is normally off so that a positive potential is applied between the gate and source of the field effect transistor 282, biasing this transistor off and preventing any charge from being applied to the sampling capacitor 286. The one-shot multivibrator is set to provide a ½ millisecond positive pulse at the base of the transistor 290 which is initiated at the end of the dropout period. The transistor 290 is then biased on, effectively reverse biasing the diode 288 so that the source and drain electrodes of the field effect transistor 282 are effectively connected together with no potential drop across the resistor 284. Accordingly, the signal on the lead 232 is then supplied through the internal resistance of the field effect transistor to the capacitor 286. At the end of the ½ millisecond pulse, the transistor 290 again goes off and the field effect transistor 282 is hard biased off. The capacitor 286, however, holds the previously sampled signal.

The capacitor 286 retains its charge until it is altered again following the output of one-shot multivibrator 238.

The charge on the capacitor 286 is measured by a unity gain amplifier stage having an extremely high input impedance so as to prevent any of the charge from leaking off. This amplifier includes another field effect transistor 292 whose gate electrode is connected to the capacitor 286 and whose drain and source electrodes are respectively connected to the base and collector of a feedback transistor 294. Further, the drain electrode is connected to a source of negative potential via a 22 KΩ resistor 296. The transistor 294 is biased by connecting a negative potential to its emitter and a positive potential to its collector via a resistor 298. The output signal corresponding to the charge on the capacitor 286 is taken over the lead 237 from the collector of the transistor 294. The transistor 294 is connected in 100% negative feedback loop with the field effect transistor 292 so as to achieve a maximum input impedance at the gate electrode.

Referring again to FIG. 6, the outputs on leads 226, 228 from the differential amplifier 224 are equal and opposite. These outputs are coupled through the summing circuits 182, 186 to the respective motor drive amplifiers 184, 188; hence, they tend to produce an equal and opposite effect on the torque supplied by the motors. The differential application of the signals to the motors enables a qiucker or higher frequency correction for tape tension, and minimizes any resulting tension perturbations in the tape adjacent the audio and control track heads located between the take-up capstan and reel.

Figure 10:
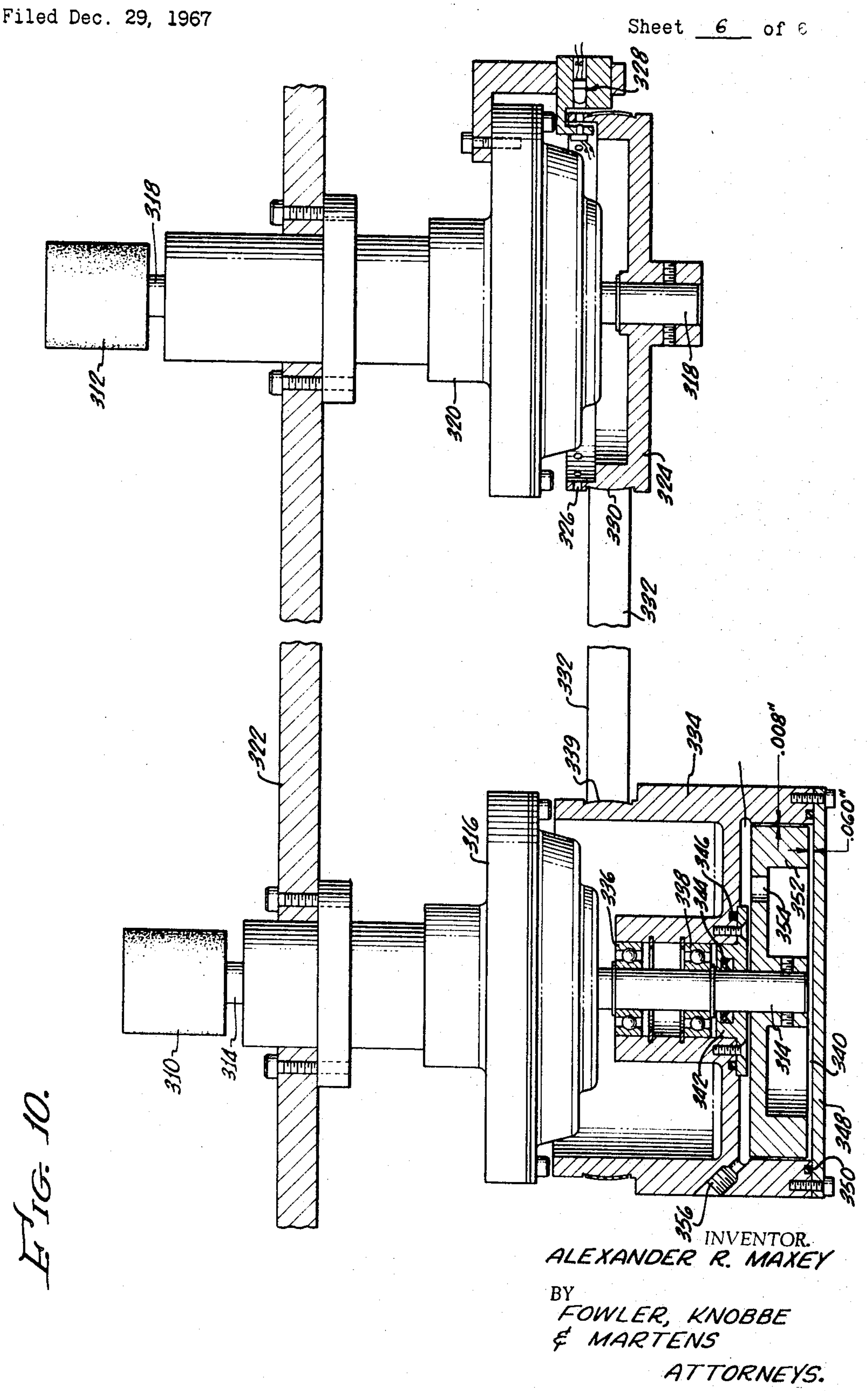
FIG. 10 is a fragmentary view, partially in section, illustrating another embodiment of the invention wherein dual capstans are rotary coupled through a pliant linkage in the form of a fluid coupling.

Referring now to FIG. 10, a different form of pliant mechanical linkage rotary couples a tape supply capstan 310 and a tape take-up capstan 312. As in the previously described embodiment of the invention, the tape supply capstan is mounted on the shaft 314 of a direct current tape supply motor 315, and the tape take-up capstan 312 is mounted on the shaft 318 of a direct current tape take-up motor 320. The direct current motors 316, 320 are mounted on and extend through a subframe 322. The assembly illustrated in FIG. 10 may be substituted for the corresponding elements illustrated in FIGS. 1 and 2.

A flywheel 324 having an inertia of about .275 inch ounce sec.$^2$ is rigidly connected by set screws to the protruding lower end of the take-up motor shaft 318. The flywheel has a plurality of apertures 326 disposed about its upper rim, which apertures cooperate with a lamp and photocell arrangement 328 similar to that described in FIG. 2. The flywheel has an external circumferential groove 330 for accommodating one end of a closed belt of tape 332 in a belt and pulley relationship.

An outer flywheel 334 having an inertia of about .181 inch ounce sec.$^2$ is rotatably journalled on the protruding lower end of the shaft 314 of the supply motor 316 by means of conventional bearings 336, 338 loaded and mounted as shown. This flywheel has a circumferential groove 339 for receiving the other end of the closed belt of tape 332 in a belt and pulley relationship. Also this flywheel contains a lower fluid tight compartment 340 into which the motor shaft 314 extends, the compartment being sealed at its upper end by a plate 342 in cooperation with a pair of annular sealing gaskets 344, 346. The compartment is sealed at its lower end by a lower plate 348 and an annular sealing gasket 350.

Within the fluid tight compartment 340, is another flywheel 352 rigidly connected by set screws to the motor shaft 314. This internal annular cup or flywheel 352 has an inertia of about .181 inch ounces sec.$^2$, with substantial outer and bottom peripheral surfaces respectively spaced about .008 and .060 inch from the corresponding internal surfaces of the compartment 340. Also, this internal flywheel 352 has an opening 354 in its web to permit free circulation of the fluid throughout the compartment 340.

The sealed compartment 340 is filled with 12,500 centistoke silicone oil through an inlet 356 in the wall of the outer flywheel 334, and this oil in conjunction with the surface spacing between the inner and outer flywheels provides a viscous or fluid coupling between them such that ten ounces of torque on one relative to the other will produce about 4° per second of rotation of one relative to the other.

The outer flywheels 324, 334 on the respective motor shafts each have a pulley diameter of about 4.6 inches, and are rotary coupled by the closed belt 332. The closed belt is Mylar tape having a thickness of about 0.15 inch, a width of about .50 inch and a loop length of about 29.6 inches. The belt is relatively stiff and acts only as a rotary coupling device. Other forms of rotary coupling could be used.

In operation, the mechanical linkage between the two capstans is pliant in that the outer flywheel 356 on the supply capstan motor is rotary coupled to the motor shaft 314 only through the interaction of the viscous fluid with the inner fllywheel 352. The net effect is a dual capstan closed loop tape drive system, which loop is slightly open to permit damped relative rotation of one capstan out of phase with respect to the other.

I claim:

1. In a drum type magnetic tape recorder for recording and/or playing back signals along successive oblique traces on a magnetic recording tape, the improvement which comprises:

a tape supply capstan and a tape take-up capstan for engaging the magnetic recording tape and moving it about the drum;

a pliant mechanical linkage rotary coupling the capstans together;

means for driving the capstans;

means for sensing tension errors in the tape extending about the drum during playback; and, means responsive to the sensing means for making compensating changes in the tape tension.

2. In a drum type magnetic tape recorder for recording and/or playing back signals along successive oblique traces on a magnetic recording tape, the improvement which comprises:

a tape supply capstan and a tape take-up capstan for engaging the magetic recording tape and moving it about the drum;

a motor coupled to the supply capstan and a motor coupled to the take-up capstan;

a pliant mechanical linkage rotary coupling the capstans together;

means for diving said motors;

means for sensing tension errors in the tape extending about the drum during playback; and control means responsive to the sensing means for applying opposite control signals respectively to the driving means for each motor so as to change the torque supplied by one motor relative to that supplied by the other.

3. The apparatus of claim 2 wherein the pliant mechanical linkage comprises:

a closed belt of tape;

means coupling said closed belt of tape in rotary relationship to the capstans;

said closed belt of tape having approximately the same physical elasticity characteristics when applied through its coupling means to the capstans as has the magnetic recording tape extending between the capstans, so that for a given angular displacement of the supply capstan out of phase relative to the take-up capstan the belt tends to produce a change in torque on the supply capstan which is of the same order of magnitude as that produced by the magnetic recording tape.

4. The apparatus of claim 2 wherein the pliant mechanical linkage comprises a fluid coupling rotary connecting the capstans together for damping rotary movement of one capstan out of phase relative to the other.

5. In a drum type magnetic tape recorder for recording and/or playing back signals along successive oblique traces on a magnetic recording tape, the improvement which comprises:

a tape supply capstan and a tape take-up capstan for engaging the magnetic recording tape and moving it about the drum;

a motor coupled to the supply capstand and a motor coupled to the take-up capstan;

means for driving each of said motors;

means for sensing tension errors in the tape extending about the drum during playback; and control means responsive to the sensing means for applying differential or opposite control signals respectively to the driving means for each motor so as to produce compensating changes in the tape tension between the capstans.

6. In a drum type magnetic tape recorder for recording and/or playing back signals along successive oblique traces on a magnetic recording tape, the improvement which comprises:

a tape supply capstan and a tape take-up capstan for engaging the magnetic recording tape and moving it about the drum;

a fluid coupling rotary connecting the capstans together for dampening rotary movement of one capstan out of phase relative to the other;

a motor coupled to the supply capstan; and means for driving said motor.

7. In a drum type magnetic tape recorder for recording and/or playing back signals along successive oblique traces on a magnetic recording tape, the improvement which comprises:

a tape supply capstan and a tape take-up capstan for engaging the magnetic recording tape and moving it about the drum;

a motor coupled to the take-up capstan;

means for driving said motor;

a closed belt of tape; and means coupling said closed belt of tape in rotary relationship to the capstans, said closed belt of tape having approximately the same physical elasticity characteristics when applied through its coupling means to the capstans as has the magnetic recording tape extending between the capstans, so that for a given angular displacement of the supply capstan out of phase relative to the take-up capstan the belt tends to produce a change in torque on the supply capstan which is of the same order of magnitude as that produced by the magnetic recording tape.

8. The apparatus of claim 7 wherein the supply and take-up capstans are connected on a pair of corresponding rotary shafts, and the means coupling the belt in rotary relationship with the capstans comprises a pair of pulleys connected to the shafts, said pulleys being of substantially larger diameter than the capstans.

References Cited

UNITED STATES PATENTS

| | | | |
|---|---|---|---|
| 3,112,052 | 11/1963 | Johnson | 226—108 |
| 3,335,929 | 8/1967 | Branco et al. | 226—188 X |

ALLEN N. KNOWLES, *Primary Examiner.*

U.S. Cl. X.R.

226—111, 188, 195